(12) United States Patent
Kim et al.

(10) Patent No.: US 9,489,740 B2
(45) Date of Patent: Nov. 8, 2016

(54) CAMERA TRACKING APPARATUS AND METHOD USING RECONSTRUCTION SEGMENTS AND VOLUMETRIC SURFACE

(71) Applicant: Electronics and Telecommunications Research Institute, Daejeon (KR)

(72) Inventors: Young Hee Kim, Daejeon (KR); Jin Ho Kim, Daejeon (KR); Ki Hong Kim, Daejeon (KR); Gil Haeng Lee, Seoul (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 163 days.

(21) Appl. No.: 14/315,123

(22) Filed: Jun. 25, 2014

(65) Prior Publication Data

US 2015/0139532 A1    May 21, 2015

(30) Foreign Application Priority Data

Nov. 20, 2013   (KR) ................. 10-2013-0141598

(51) Int. Cl.
*G06K 9/00*     (2006.01)
*G06T 7/00*     (2006.01)

(52) U.S. Cl.
CPC .................. *G06T 7/0071* (2013.01)

(58) Field of Classification Search
None
See application file for complete search history.

(56) References Cited

U.S. PATENT DOCUMENTS

| | | | |
|---|---|---|---|
| 8,401,242 B2 | 3/2013 | Newcombe et al. | |
| 9,053,571 B2* | 6/2015 | Shotton | G06T 17/10 |
| 9,076,250 B2* | 7/2015 | Kim | G06T 17/00 |
| 9,251,590 B2* | 2/2016 | Sharp | G06T 7/0046 |
| 2008/0123960 A1* | 5/2008 | Kim | G06K 9/38 382/173 |
| 2012/0105602 A1* | 5/2012 | McNamer | H04N 13/0022 348/50 |
| 2012/0306876 A1* | 12/2012 | Shotton | G06T 17/10 345/424 |
| 2013/0147789 A1 | 6/2013 | Kim | |
| 2014/0003705 A1* | 1/2014 | Taguchi | G06T 7/0032 382/154 |
| 2014/0146057 A1* | 5/2014 | Kim | G06T 17/00 345/504 |
| 2015/0139532 A1* | 5/2015 | Kim | G06T 7/0071 382/154 |
| 2015/0178908 A1* | 6/2015 | Jesenko | G06T 7/003 433/29 |
| 2015/0356747 A1* | 12/2015 | Dielacher | G06T 7/2086 348/142 |
| 2016/0071278 A1* | 3/2016 | Leonard | G06T 7/0071 348/47 |

OTHER PUBLICATIONS

Canelhas, Daniel R., "Scene Representation, Registration and Object Detection in a Truncated Signed Distance Function Representation of 3D Space", Master's Thesis 2012.*

(Continued)

*Primary Examiner* — Aaron W Carter (57) ABSTRACT

Provided are an apparatus and method for tracking a camera that reconstructs a real environment in three dimensions by using reconstruction segments and a volumetric surface. The camera tracking apparatus using reconstruction segments and a volumetric surface includes a reconstruction segment division unit configured to divide three-dimensional space reconstruction segments extracted from an image acquired by a camera, a transformation matrix generation unit configured to generate a transformation matrix for at least one reconstruction segment among the reconstruction segments obtained by the reconstruction segment division unit, and a reconstruction segment connection unit configured to rotate or move the at least one reconstruction segment according to the transformation matrix generated by the reconstruction segment division unit and connect the rotated and moved reconstruction segment with another reconstruction segment.

20 Claims, 9 Drawing Sheets

(56) References Cited

OTHER PUBLICATIONS

Bylow et al., "Real-Time Camera Tracking and 3D Reconstruction Using Signed Distance Functions", Proceedings of Robotics: Science and Systems, Jun. 2013.*

Izadi et al. "KinectFusion: Real-Time 3D Reconstruction and Interaction Using a Moving Depth Camera", Oct. 2011.*

Richard A. Newcombe et al., "KinectFusion: Real-Time Dense Surface Mapping and Tracking", Proceedings of the 2011 10th IEEE International Symposium, Oct. 2011, pp. 127-136, IEEE.

Nikolas Engelhard et al., "Real-time 3D visual SLAM with a hand-held RGB-D camera", Proc. of the RGB-D Workshop on 3D Perception in Robotics at the European Robotics Forum, Apr. 2011.

* cited by examiner

| 1.5 | 1.3 | 1.2 | 1.0 | 1.1 | 1.5 |
|---|---|---|---|---|---|
| 0.5 | 0.3 | 0.2 | 0.0 | 0.1 | 0.5 |
| -0.1 | -0.1 | -0.5 | -1.0 | -1.1 | -0.1 |
| -1.1 | -1.1 | -1.5 | -2.0 | -2.1 | -1.1 |

S(N+1, M)

| 2.7 | 2.1 | 1.1 | 0.8 | 0.1 | 0.1 |
|---|---|---|---|---|---|
| 1.7 | 1.1 | 0.1 | -0.2 | -0.6 | -0.6 |
| 0.7 | 0.1 | -0.2 | -1.2 | -1.6 | -1.6 |
| -0.2 | -0.9 | -1.2 | -2.2 | -2.6 | -2.6 |

CAMERA TRACKING APPARATUS AND METHOD USING RECONSTRUCTION SEGMENTS AND VOLUMETRIC SURFACE

CROSS-REFERENCE TO RELATED APPLICATIONS

This application claims priority under 35 U.S.C. §119 to Korean Patent Application No. 10-2013-0141598, filed on Nov. 20, 2013, the disclosure of which is incorporated herein by reference in its entirety.

TECHNICAL FIELD

The present invention relates to a camera tracking apparatus and method that may reconstruct a real environment in three dimensions by using reconstruction segments and a volumetric surface.

BACKGROUND

Recently, a low-price RGB-D sensor such as a Kinect sensor of Microsoft Corporation is commercially available, and research is being conducted on a camera tracking method for tracking movement of a camera in real time by using a monoscopic camera, which is classified into Structure From Motion (SFM) and monocular Simultaneous Localization And Mapping (SLAM).

Also, KinectFusion algorithm has been presented, which can reconstruct an image of an indoor environment, which is photographed using a Kinect sensor camera by a moving user, in real time and three dimensions.

The KinectFusion algorithm method may perform a real-time image processing by representing a reconstruction area in a method of storing a Signed Distance Function (SDF) value to a voxel grid, and performing its vast calculation with a Graphic Processing Unit (GPU).

In addition, one of core technologies of the KinectFusion algorithm method is to use not a method of tracking movement of a camera from a relation between two adjacent frames among consecutive input frames (frame-to-frame registration) but a method of combining data between previous frames, generating a model as a result of reconstruction in a middle stage, and tracking movement of a camera from a relation between data of a current frame (frame-to-model registration).

The frame-to-model registration method allows more accurate and stable camera tracking than the frame-to-frame registration method in the related art.

However, the KinectFusion method is suitable for reconstructing a small space or object in three dimensions but not suitable for a complicated and large space, which has the following problems.

A low-price RGB-D sensor camera such as a Kinect sensor is subject to an error. Once the error occurs during a camera tracking process, the error is consistently accumulated, thereby resulting in breaking a reconstruction result.

In order to solve a problem of Loop Closure due to an error generated or accumulated during the reconstruction process, a global optimization method may be used. However, since the method should use data for an entire reconstruction process, it is difficult to be applied to a real-time processing.

SUMMARY

Accordingly, the present invention provides a camera tracking apparatus and method using reconstruction segments and a volumetric surface, which may divide a reconstruction intermediate result into reconstruction segments at certain intervals during a reconstruction process, acquires information about a relative camera location between the reconstruction segments, and correct the reconstruction intermediate result, thereby correcting a tracking error of a camera that reconstructs a real environment in three dimensions by using the reconstruction segments and the volumetric surface.

In one general aspect, a camera tracking apparatus using reconstruction segments and a volumetric surface, the camera tracking apparatus includes: a reconstruction segment division unit configured to divide three-dimensional space reconstruction segments extracted from an image acquired by a camera; a transformation matrix generation unit configured to generate a transformation matrix for a first reconstruction segment having a distortion among the reconstruction segments obtained by the reconstruction segment division unit; and a reconstruction segment connection unit configured to rotate or move the first reconstruction segment having a distortion according to the transformation matrix generated by the transformation matrix generation unit and connect the rotated and moved reconstruction segment with a second reconstruction segment having no distortion.

In another general aspect, a camera tracking method using reconstruction segments and a volumetric surface, the camera tracking method includes: extracting three-dimensional space reconstruction segments from an image acquired by a camera and dividing the reconstruction segments; generating a transformation matrix for a first reconstruction segment having a distortion among the divided reconstruction segments; converting the first reconstruction segment having a distortion according to the transformation matrix; and connecting the converted first reconstruction segment with the second reconstruction segment having no distortion.

In still another general aspect, a camera tracking apparatus using reconstruction segments and a volumetric surface, the camera tracking apparatus includes: a first graphic processing unit (GPU) configured to generate a first reconstruction segment from an image acquired by a camera and store the generated first reconstruction segment; and a second GPU configured to, when a preset reconstruction segment division condition is satisfied, generate a second reconstruction segment having as a start frame a frame after the first reconstruction segment and store the generated second reconstruction segment, in which the second GPU transmits data of the second reconstruction segment to the first GPU when a third reconstruction segment is generated and generates and stores the three reconstruction segment, and the first GPU connects the first reconstruction segment with the second reconstruction segment received from the second GPU.

Other features and aspects will be apparent from the following detailed description, the drawings, and the claims.

DETAILED DESCRIPTION OF EMBODIMENTS

Hereinafter, preferred embodiments of a camera tracking apparatus and method using reconstruction segments and a volumetric surface according to the present invention will be described in detail with reference to the accompanying drawings. Moreover, detailed descriptions related to well-known functions or configurations will be ruled out in order not to unnecessarily obscure subject matters of the present invention.

Figure 1:
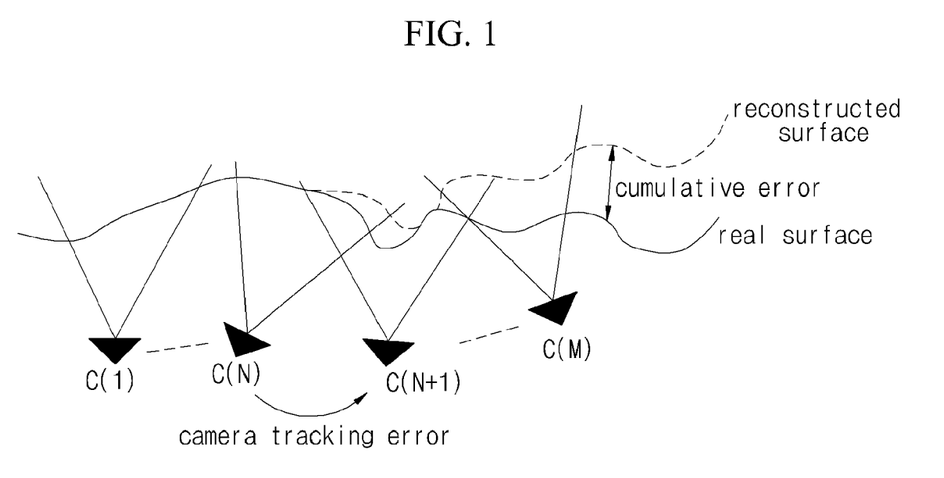
FIG. 1 is a conceptual view illustrating a camera tracking process with hand-held camera and reconstruction error.

FIG. 1 is a conceptual view illustrating a camera tracking process with hand-held camera and reconstruction error.

Referring to FIG. 1, a reconstruction method using a RGB-D sensor such as KinectFusion in the related art is used to reconstruct a three-dimensional space that is photographed while moving a hand-held camera.

In this case, C(1) indicates a location of a camera corresponding to a first frame, and C(N) indicates a location of a camera corresponding to an n-th frame.

Referring to FIG. 1, when a camera tracking error about a camera for tracking a location of C(N+1) occurs, the camera tracking error affects a reconstruction result. The error is accumulated to affect an entire reconstruction result.

Figure 3:
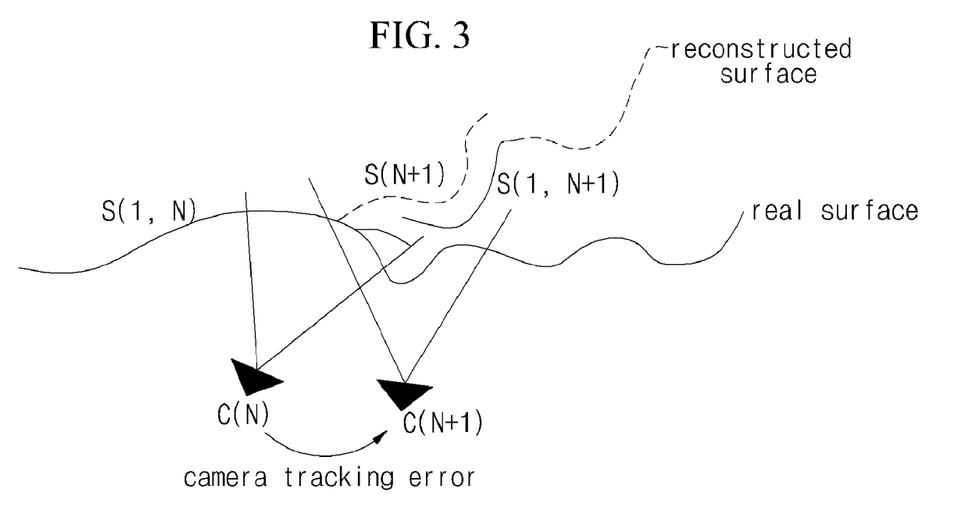
FIG. 3 is a conceptual view illustrating an error between reconstruction segments and a real surface, which is generated because of a camera tracking error.

FIG. 3 shows a reconstruction result generated when a camera tracking error occurs.

Referring to FIG. 3, S(1, N) denotes a reconstructed surface that is reconstructed using data from a first frame to an nth frame, and S(N, 1) denotes a temporary surface of an intermediate step N+1 for C(N+1) location tracking That is, S(1, N+1) surface is generated by taking a weighted sum of S(1, N) and S(N+1), and then reflected to the reconstruction result.

Figure 2:
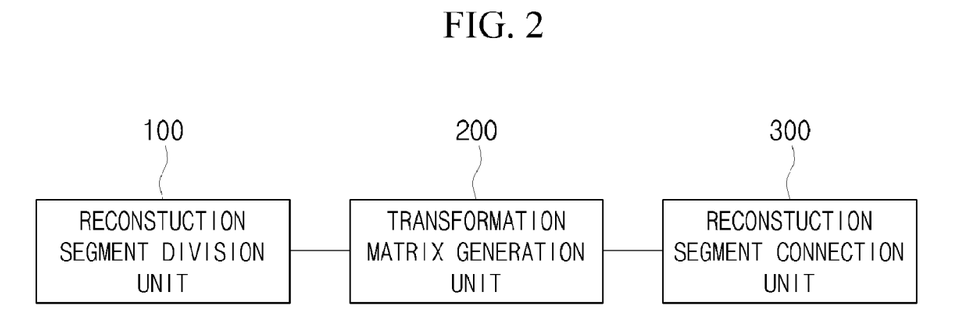
FIG. 2 is a block diagram illustrating a camera tracking apparatus using reconstruction segments and a volumetric surface according to an embodiment of the present invention.

FIG. 2 is a block diagram illustrating a camera tracking apparatus using reconstruction segments and a volumetric surface according to an embodiment of the present invention.

Referring to FIG. 2, a camera tracking apparatus using reconstruction segments and a volumetric surface according to the present invention includes a reconstruction segment division unit 100 for dividing three-dimensional space reconstruction segments extracted from an image acquired by a camera, a transformation matrix generation unit 200 for generating a transformation matrix for a first reconstruction segment having a distortion among the reconstruction segments obtained by the division by the reconstruction segment division unit 100; and a reconstruction segment connection unit 300 for converting the first reconstruction segment having a distortion according to the transformation matrix generated by the transformation matrix generation unit 200 to rotate or move the first reconstruction segment and connecting the rotated or moved first reconstruction segment with a second reconstruction segment having no distortion.

In this case, the reconstruction segment division unit 100 divides the reconstruction segments at a timing in which a movement factor of a camera is greater than a preset value or in preset units of frame.

Figure 4:
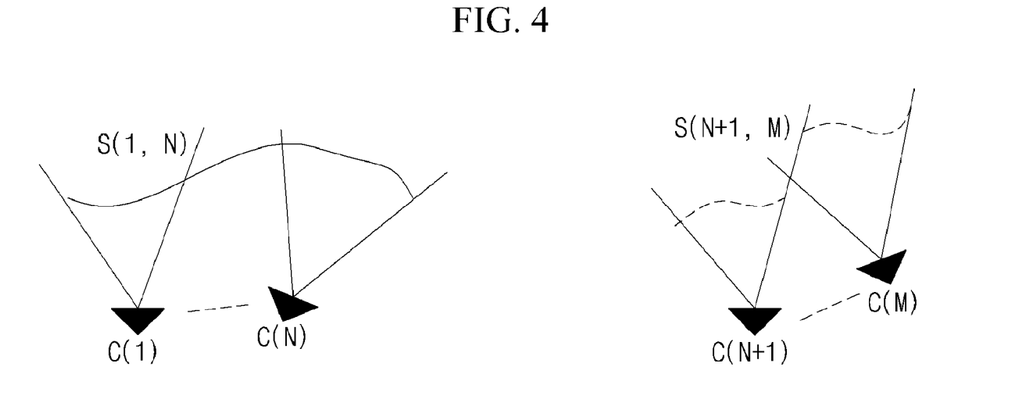
FIG. 4 is a conceptual view illustrating reconstruction segment division according to the present invention.

FIG. 4 is a conceptual view illustrating reconstruction segment division according to the present invention. Referring to FIG. 4, the divided reconstruction segments are classified into S(1, N) and S(N+1, M).

Figure 5:
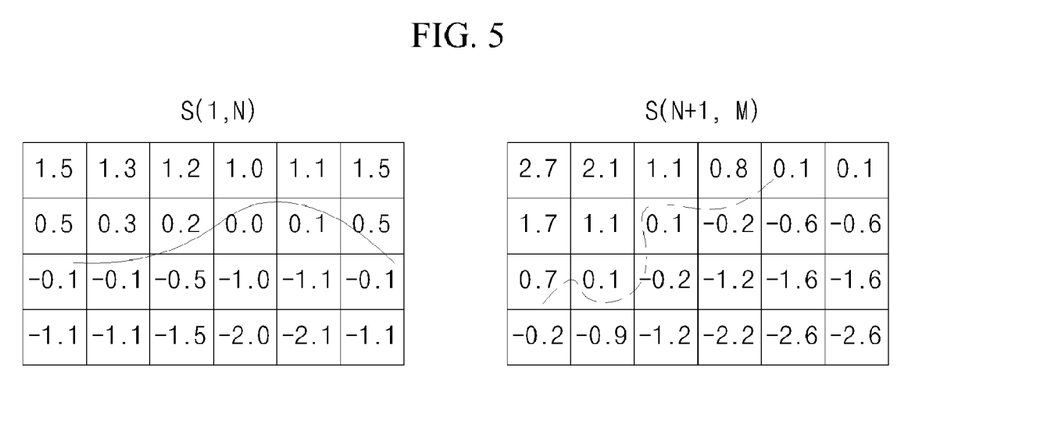
FIG. 5 is a view illustrating SDF in a voxel grid of reconstruction segments according to the present invention.

FIG. 5 is a view illustrating SDF in a voxel grid of reconstruction segments according to the present invention. Referring to FIG. 5, a left table denotes a voxel grid (1, N) storing a surface S(1, N) on the basis of a camera C(1), and a right table denotes a voxel grid (N+1, M) storing a surface S(N+1, M) on the basis of the camera C(1).

Figure 6:
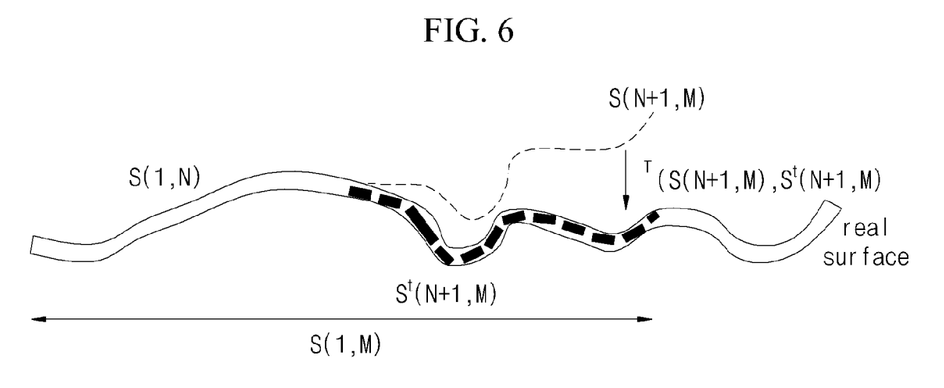
FIG. 6 is a view illustrating reconstruction segment connection using a transformation matrix according to the present invention.

FIG. 6 is a view illustrating reconstruction segment connection using a transformation matrix according to the present invention. Referring to FIG. 6, the camera tracking apparatus using reconstruction segments and a volumetric surface according to the present invention applies a transformation matrix for transforming a surface S(N+1, M) having a distortion due to a camera tracking error into a surface S'(N+1, M) and connects S'(N+1, M) with the surface S(1, N) having no distortion to generate a surface S(1, M).

In this case, a transformation matrix T is calculated using an SDF, which is data of the surface S(1, N) and the surface S(N+1, M).

The transformation matrix generation unit 200 of the camera tracking apparatus using reconstruction segments and a volumetric surface according to the present invention sets a reference camera at a point between a camera location corresponding to a start frame of the first reconstruction segment having a distortion and a camera location corresponding to an end frame of the second reconstruction segment having no distortion, which are the reconstruction segments obtained by the division by the reconstruction segment division unit 100, and generates a map set for the first reconstruction segment and second reconstruction segment of the reference camera.

In addition, the transformation matrix generation unit 200 generates a map set including a vertex map and a normal map for the first reconstruction segment and the second reconstruction segment of the reference camera and applies an Iterative Closest Point (ICP) algorithm to the generated map set to generate a transformation matrix of the first reconstruction segment.

Figure 7:
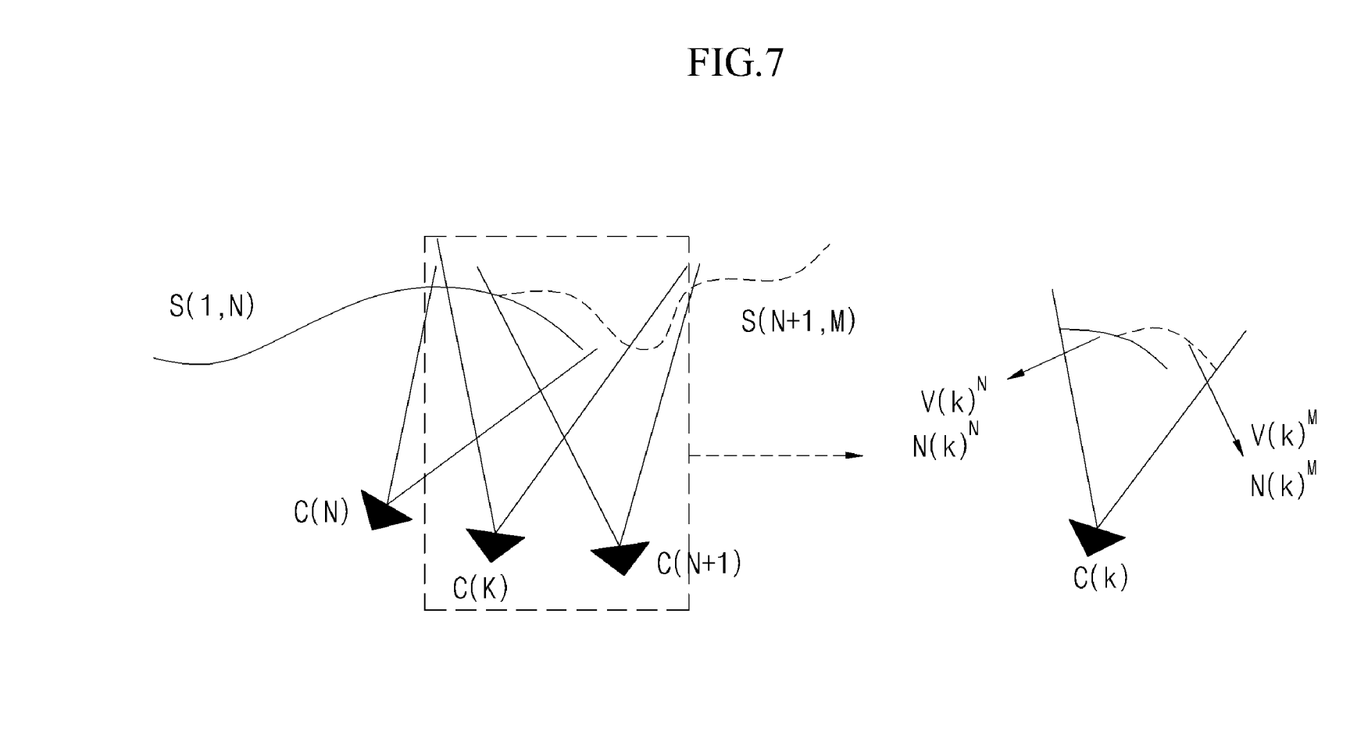
FIG. 7 is a conceptual view illustrating a process of calculating a transformation matrix for reconstruction segment connection according to the present invention.

FIG. 7 is a conceptual view illustrating a process of calculating a transformation matrix for reconstruction segment connection according to the present invention.

That is, referring to FIG. 7, the transformation matrix generation unit 200 sets a reference camera C(k) at a point between a camera location C(N+1) corresponding to the start frame of the first reconstruction segment S(N+1, M) having a distortion and a camera location C(N) corresponding to an end frame of the second reconstruction segment S(1, N) having no distortion, acquires a vertex map $V(k)^N$ and a normal map $N(k)^N$ from a surface S(1, N) having no distortion, acquires a vertex map $V(k)^M$ and a normal map $N(k)^M$ from a surface S(N+1, M) having a distortion, and applies an Iterative Closest Point (ICP) algorithm to the generated map set to find a transformation matrix T.

In addition, the reconstruction segment connection unit 300 of the camera tracking apparatus using reconstruction segments and a volumetric surface according to the present invention applies an inverse matrix of the transformation matrix generated by the transformation generation unit 200 to a voxel grid domain of the first reconstruction segment having a distortion and applies the inverse matrix, which includes a rotation matrix and a movement matrix, to a signed distance function (SDF) value of the first reconstruction segment.

Matrix concatenation such as rotation and translation is global isometry in a Euclidean space. In this case, all characteristics of the SDF are conserved even after calculation.

That is, as shown in Equation (1), in order to apply the transformation matrix T to reconstruction segment represented as SDF $\phi_i(\vec{x}_i)$, an inverse matrix of the transformation matrix T should be applied to the voxel grid domain of the reconstruction segment. The SDF of the reconstruction segment having the transformation matrix applied thereto is as shown in Equation (2). Equation (3) is an extension of Equation (2). $R(\hat{e},\theta)$ denotes a rotation matrix for rotation of an angle $\theta$ about an axis $\hat{e}$. $\vec{t}$ denotes a movement matrix for movement by a vector $\vec{t}$. In addition, $\vec{x}_j$ denotes a vector from a location of the reference camera to an ith cell of a voxel, and di denotes a depth to the surface.

$$\phi_i(\vec{x}_i, d_i) = |\vec{x}_i| - d_i \qquad (1)$$

$$\phi_i(T^{-1}(\vec{x}_i)) \qquad (2)$$

$$\phi_i(R(\hat{e},-\theta)\vec{x}_i - \vec{t}) \qquad (3)$$

In this case, Equation (4) is obtained if the first reconstruction segment surface S(N+1, M) having a distortion refers to $\phi_i(\vec{x}_i)$, and a surface having the transformation matrix applied thereto refers to $\phi'_i(\vec{x}_i)$.

$$\phi'_i(\vec{x}_i) = \phi_i(T^{-1}(\vec{x}_i)) = \phi_i(\vec{x}'_i) = |\vec{x}'_i| - d_i \qquad (4)$$

In this case, di is depth information and Equation (5) is obtained using Equation (1).

$$d_i = |\vec{x}_i| - \phi_i \qquad (5)$$

In addition, $\vec{x}'_i$, which is obtained by applying a vector $\vec{x}_i$ to the transformation matrix, may be found as shown in Equation (6).

$$\vec{x}'_i = T^{-1}(\vec{x}_i) \qquad (6)$$

In addition, the reconstruction segment connection unit 300 of the camera tracking apparatus using reconstruction segments and a volumetric surface according to the present invention connects the first reconstruction segment having the inverse matrix applied thereto and the second reconstruction segment on the basis of an SDF value of the first reconstruction segment, an SDF value of the second reconstruction segment, and weight functions of the first reconstruction segment and the second reconstruction segment.

That is, when the SDF of the second reconstruction segment surface S(1, N) refers to $\phi^N(\vec{x}_i, d_i)$, and the SDF of the first reconstruction segment surface S(N+1, M) refers to $\phi^M(\vec{x}_i, d_i)$, an SDF of a surface obtained by connecting the reconstruction segments is $\phi^{1M}(\vec{x}_i)$. Thus Equations (7) and (8) are formed as follows.

$$\phi^{1M}(\vec{x}_i) = \frac{W^N(\vec{x}_i)\phi^N(\vec{x}_i) + W^M(\vec{x}_i)\phi^M(\vec{x}_i, d_i)}{W^N(\vec{x}_i) + W^M(\vec{x}_i)} \qquad (7)$$

$$W^{1M}(\vec{x}_i) = W^N(\vec{x}_i) + W^M(\vec{x}_i) \qquad (8)$$

where $W^N(\vec{x}_i)$ and $W^M(\vec{x}_i)$ are weight functions of ith cells in the second reconstruction segment surface S(1, N) and the first reconstruction segment surface S(N+1, M).

Figure 8:
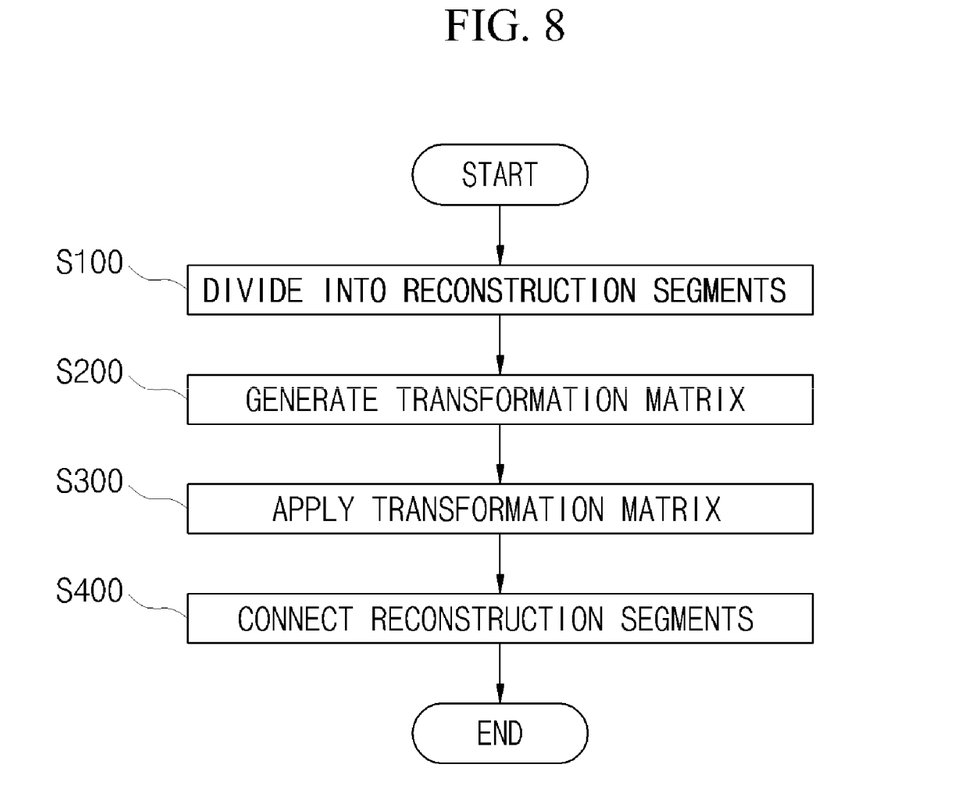
FIG. 8 is a flowchart illustrating a camera tracking method using reconstruction segments and a volumetric surface according to the present invention.

FIG. 8 is a flowchart illustrating a camera tracking method using reconstruction segments and a volumetric surface according to the present invention.

Referring to FIG. 8, a camera tracking method using reconstruction segments and a volumetric surface according to the present invention includes a reconstruction segment division operation S100 of dividing three-dimensional space reconstruction segments extracted from an image previously acquired by a camera, a transformation matrix generation operation S200 of generating a transformation matrix for a first reconstruction segment having a distortion among the reconstruction segments acquired by the division during the reconstruction segment division operation S100, a transformation matrix application operation S300 of transforming the first reconstruction segment having the distortion according to the transformation matrix generated during the transformation matrix generation operation S200, and a reconstruction segment connection operation S400 of connecting the first reconstruction segment having the distortion and a second reconstruction segment having no distortion.

In this case, the reconstruction segment division operation S100 includes dividing the reconstruction segments at a timing in which a movement of a camera is greater than a preset range or in preset units of frame. FIG. 4 shows the second reconstruction segment S(1, N) having no distortion and the first reconstruction segment S(N+1, M) having a distortion, which are obtained by the division during the reconstruction segment division operation S100.

In addition, the transformation matrix generation operation S200 generates a map set for the first reconstruction segment and the second reconstruction segment on the basis of the reference camera acquiring an image at a location between a camera corresponding to a start frame of the first reconstruction segment and a camera corresponding to an end frame of the second reconstruction segment according to a moving route of a camera. Referring to FIG. 7, the transformation matrix generation operation S200 generates a map set of a vertex map and a normal map on the basis of a reference camera C(k) acquiring an image at a point between a camera C(N+1) corresponding to a start frame of the first reconstruction segment and a camera C(N) corresponding to an end frame of the second reconstruction segment.

In this case, the transformation matrix application operation S300 applies an inverse matrix of the transformation matrix to a voxel grid domain of the first reconstruction segment and applies the inverse matrix, which includes a rotation matrix and a movement matrix, to an SDF value of the first reconstruction segment.

In addition, the reconstruction segment connection operation S400 connects the first reconstruction segment having the inverse matrix applied thereto using Equations (7) and (8) and the second reconstruction segment on the basis of an SDF value of the first reconstruction segment, an SDF value of the second reconstruction segment, and weight functions of the first reconstruction segment and the second reconstruction segment.

In another embodiment of the present invention, a reconstruction area is divided into two and then stored. In order to perform calculation for connecting two reconstruction areas, there are two or more graphic processing units (GPUs) for generating and storing the reconstruction segments. Each GPU generates and stores consecutive reconstruction segments.

That is, a camera tracking apparatus using reconstruction segments and a volumetric surface according to another embodiment of the present invention includes a first graphic processing unit (GPU) for generating a first reconstruction segment S(1, N) from an image acquired by a camera and storing the generated first reconstruction segment S(1, N) and a second GPU for generating a second reconstruction segment S(N+1, M) and storing the generated second reconstruction segment S(N+1, M) when a preset reconstruction division condition is satisfied.

In this case, when generating a third reconstruction segment S(M+1) consecutive to the second reconstruction segment, the second GPU transmits data of the second reconstruction segment to the first GPU and generates and stores the third reconstruction segment, and the first GPU connects the second reconstruction segment S(N+1. M) received from the second GPU with the first reconstruction segment S(1, N) to acquires S(1, M).

In this case, the second GPU determines that the reconstruction division condition is satisfied when a movement vector of the camera is greater than a preset value or when a first reconstruction segment is generated in preset units of frame, and generates and stores the second reconstruction segment.

A camera tracking apparatus using reconstruction segments and a volumetric surface according to another embodiment of the present invention further includes a transformation matrix generation unit for generating a transformation matrix for the second reconstruction segment when the second reconstruction segment has a distortion due to a camera tracking error and applying the generated transformation matrix to the second reconstruction segment transmitted from the second GPU to the first GPU to transform the second reconstruction segment.

Referring to FIG. 7, the transformation matrix generation unit generates a map set for the first reconstruction segment and the second reconstruction segment on the basis of a virtual reference camera between a camera C(N) corresponding to an end frame of the first reconstruction and a camera C(N+1) corresponding to a start frame of the second segment, applies an ICP algorithm to the generated map set to generate a transformation matrix, and applies an inverse matrix of the transformation matrix to a voxel grid domain of the second reconstruction segment.

In addition, the first GPU connects the first reconstruction segment having the inverse matrix applied thereto using Equations (7) and (8) and the second reconstruction segment on the basis of an SDF value of the first reconstruction segment, an SDF value of the second reconstruction segment, and weight functions of the first reconstruction segment and the second reconstruction segment.

The camera tracking apparatus and method using the reconstruction segments and the volumetric surface according to the present invention can correct a camera tracking error in real time by applying the model-to-model method, instead of applying a method of storing data of all frames and correcting the error of the camera tracking in non-real time like global optimization.

In addition, it is possible to reduce the camera tracking error by dividing the reconstruction intermediate result into the reconstruction segments and applying the model-to-model method to acquire information about relative locations of the camera between the reconstruction segments.

It is also possible to perform reconstruction in real time without reducing a reconstruction area by applying model-to-model method with a plurality of graphic processing units (GPUs).

The effect of the present invention is not limited to the aforesaid, but other effects not described herein will be clearly understood by those skilled in the art from descriptions below.

This invention has been particularly shown and described with reference to preferred embodiments thereof. It will be understood by those skilled in the art that various changes in form and details may be made therein without departing from the spirit and scope of the invention as defined by the appended claims. Accordingly, the referred embodiments should be considered in descriptive sense only and not for purposes of limitation. Therefore, the scope of the invention is defined not by the detailed description of the invention but by the appended claims, and all differences within the scope will be construed as being included in the present invention.

Figure 9:
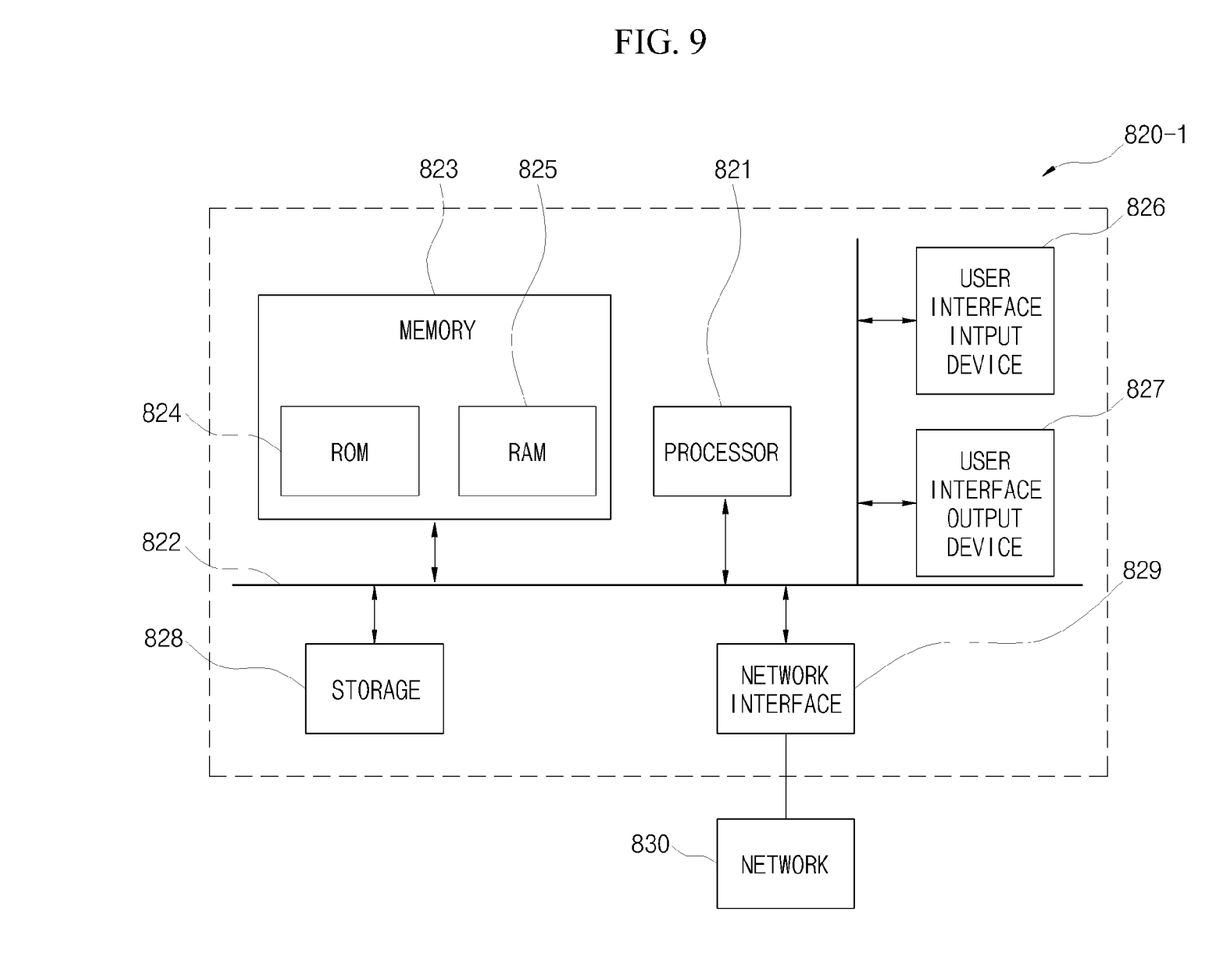
FIG. 9 is an exemplary diagram of a computer system implementing an embodiment of the present invention.

An embodiment of the present invention may be implemented in a computer system, e.g., as a computer readable medium. As shown in FIG. 9, a computer system 820-1 may include one or more of a processor 821, a memory 823, a user input device 826, a user output device 827, and a storage 828, each of which communicates through a bus 822. The computer system 820-1 may also include a network interface 829 that is coupled to a network. The processor 821 may be a central processing unit (CPU) or a semiconductor device that executes processing instructions stored in the memory 823 and/or the storage 828. The memory 823 and the storage 828 may include various forms of volatile or non-volatile storage media. For example, the memory may include a read-only memory (ROM) 824 and a random access memory (RAM) 825.

Accordingly, an embodiment of the invention may be implemented as a computer implemented method or as a non-transitory computer readable medium with computer executable instructions stored thereon. In an embodiment, when executed by the processor, the computer readable instructions may perform a method according to at least one aspect of the invention.

What is claimed is:

1. A camera tracking apparatus comprising:
    a reconstruction segment generation unit to generate, using a processor, three-dimensional space reconstruction segments for a reconstruction process from an image including depth information obtained by a camera, the reconstruction segments including first and second reconstruction segments;
    a transformation matrix generation unit to generate, using a processor, a transformation matrix for the first reconstruction segment having a distortion among the generated reconstruction segments during the reconstruction process; and
    a reconstruction segment connection unit to rotate or move, or rotate and move, using a processor, the first reconstruction segment according to the transformation matrix, and to connect the rotated or moved, or the rotated and moved first reconstruction segment with the second reconstruction segment having substantially no distortion,
    wherein the reconstruction segment generation unit generates a corresponding one of the reconstruction segments based on a timing when a movement factor of the camera is greater than a preset value.

2. The camera tracking apparatus of claim 1, wherein the transformation matrix generation unit sets a reference camera at a position between a first position of the camera corresponding to a start frame of the first reconstruction segment and a second position of the camera corresponding to an end frame of the second reconstruction segment, and generates a map set for the first reconstruction segment and the second reconstruction segment using the reference camera.

3. The camera tracking apparatus of claim 2, wherein the transformation matrix generation unit generates the map set including a vertex map and a normal map for the first reconstruction segment and the second reconstruction segment using the reference camera, and applies an Iterative Closest Point (ICP) algorithm to the generated map set to generate the transformation matrix of the first reconstruction segment.

4. The camera tracking apparatus of claim 3, wherein the reconstruction segment connection unit applies an inverse matrix of the transformation matrix generated by the transformation matrix generation unit to a voxel grid domain of the first reconstruction segment.

5. The camera tracking apparatus of claim 4, wherein the reconstruction segment connection unit applies the inverse matrix including a rotation matrix and a movement matrix to a signed distance function (SDF) value of the first reconstruction segment.

6. The camera tracking apparatus of claim 5, wherein the reconstruction segment connection unit connects the first reconstruction segment to which the inverse matrix has been applied and the second reconstruction segment based on the SDF value of the first reconstruction segment, an SDF value of the second reconstruction segment, and weight functions of the first reconstruction segment and the second reconstruction segment.

7. A camera tracking method comprising:
generating three-dimensional space reconstruction segments for a reconstruction process from an image including depth information obtained by a camera, the reconstruction segments including first and second reconstruction segments;
generating a transformation matrix for the first reconstruction segment having a distortion among the generated reconstruction segments during the reconstruction process;
converting the first reconstruction segment according to the transformation matrix; and
connecting the converted first reconstruction segment with the second reconstruction segment having substantially no distortion,
wherein generating the three-dimensional space reconstruction segments comprises generating a corresponding one of the reconstruction segments based on a timing when a movement of the camera is greater than a preset value.

8. The camera tracking method of claim 7, wherein generating the transformation matrix comprises generating a map set for the first reconstruction segment and the second reconstruction segment based on a position of a reference camera, and
wherein the reference camera obtains an image at the position between a first position of the camera corresponding to a start frame of the first reconstruction segment and a second position of the camera corresponding to an end frame of the second reconstruction segment along a moving route of the camera.

9. The camera tracking method of claim 8, wherein the generated map set includes a vertex map and a normal map for the first reconstruction segment and the second reconstruction segment, and wherein generating the transformation matrix further comprises applying an Iterative Closest Point (ICP) algorithm to the generated map set to generate the transformation matrix.

10. The camera tracking method of claim 9, wherein converting the first reconstruction segment comprises applying an inverse matrix of the transformation matrix to a voxel grid domain of the first reconstruction segment.

11. The camera tracking method of claim 10, wherein the inverse matrix includes a rotation matrix and a movement matrix, and the inverse matrix is applied to a signed distance function (SDF) value of the first reconstruction segment.

12. The camera tracking method of claim 11, wherein connecting the converted first reconstruction segment comprises connecting the first reconstruction segment to which the inverse matrix has been applied and the second reconstruction segment based on the SDF value of the first reconstruction segment, an SDF value of the second reconstruction segment, and weight functions of the first reconstruction segment and the second reconstruction segment.

13. A camera tracking apparatus comprising:
a first graphic processing unit (GPU) to generate, using a processor, a first reconstruction segment from a first plurality of frames obtained by a camera, and store the generated first reconstruction segment; and
a second GPU to generate, when a preset reconstruction segment division condition is satisfied, using a processor, a second reconstruction segment from a second plurality of frames obtained by the camera, the second plurality of frames including a frame after the first reconstruction segment as a start frame, and store the generated second reconstruction segment,
wherein the second GPU generates a third reconstruction segment, transmits data of the second reconstruction segment to the first GPU when the third reconstruction segment is generated, and stores the generated third reconstruction segment,
wherein the first GPU connects the first reconstruction segment with the second reconstruction segment received from the second GPU, and
wherein the second GPU determines that the reconstruction division condition is satisfied when a movement vector of the camera is greater than a preset value.

14. The camera tracking apparatus of claim 13, further comprising a transformation matrix generation unit to generate, using a processor, a transformation matrix for the second reconstruction segment when the second reconstruction segment has a distortion, and to apply the generated transformation matrix to the second reconstruction segment transmitted from the second GPU to the first GPU to transform the second reconstruction segment.

15. The camera tracking apparatus of claim 14, wherein the transformation matrix generation unit generates a map set for the first reconstruction segment and the second reconstruction segment based on a virtual reference camera, the virtual reference camera being positioned between a first position of the camera corresponding to an end frame of the first reconstruction segment and a second position of the camera corresponding to a start frame of the second reconstruction segment, and
wherein the transformation matrix generation unit applies an Iterative Closest Point (ICP) algorithm to the generated map set to generate the transformation matrix.

16. The camera tracking apparatus of claim 15, wherein the transformation matrix generation unit applies an inverse matrix of the transformation matrix to a voxel grid domain of the second reconstruction segment.

17. The camera tracking apparatus of claim 16, wherein the first GPU connects the second reconstruction segment to which the inverse matrix has been applied and the first reconstruction segment based on a signed distance function (SDF) value of the second reconstruction segment, an SDF value of the first reconstruction segment, and weight functions of the first reconstruction segment and the second reconstruction segment.

18. The camera tracking apparatus of claim 1, wherein the camera is configured to move along a three-dimensional surface.

19. The camera tracking method of claim 7, wherein the camera is moved along a three-dimensional surface.

20. The camera tracking apparatus of claim 13, wherein the camera is configured to move along a three-dimensional surface and to obtain the first and second pluralities of frames of the three-dimensional surface.

* * * * *